US008873081B2

(12) United States Patent
Yoshimura

(10) Patent No.: US 8,873,081 B2
(45) Date of Patent: Oct. 28, 2014

(54) IMAGE FORMING APPARATUS AND IMAGE FORMING SYSTEM

(75) Inventor: Sachiko Yoshimura, Osaka (JP)

(73) Assignee: KYOCERA Document Solutions Inc. (JP)

( * ) Notice: Subject to any disclaimer, the term of this patent is extended or adjusted under 35 U.S.C. 154(b) by 940 days.

(21) Appl. No.: 12/759,462

(22) Filed: Apr. 13, 2010

(65) Prior Publication Data
US 2010/0302582 A1 Dec. 2, 2010

(30) Foreign Application Priority Data
Jun. 2, 2009 (JP) ................................ 2009-133522

(51) Int. Cl.
G06F 13/00 (2006.01)
H04N 1/44 (2006.01)
G06K 15/00 (2006.01)

(52) U.S. Cl.
CPC ........... *H04N 1/4406* (2013.01); *H04N 1/4433* (2013.01); *H04N 2201/0094* (2013.01)
USPC ....... 358/1.14; 358/1.13; 358/1.16; 358/1.15; 726/2

(58) Field of Classification Search
CPC ..... G06F 15/00; G06F 21/608; G06F 21/629; G06F 3/1239; H04L 63/083; H04N 1/00244; H04N 1/4406; H04N 1/4433
USPC .......... 358/1.1, 1.9, 2.1, 1.11–1.18, 400–404; 726/5; 713/164–172
See application file for complete search history.

(56) References Cited

U.S. PATENT DOCUMENTS

| 2004/0117784 | A1* | 6/2004 | Endoh ........................... 717/169 |
| 2006/0001900 | A1* | 1/2006 | Watanabe et al. ............ 358/1.14 |
| 2006/0026434 | A1 | 2/2006 | Yoshida et al. |
| 2007/0076241 | A1* | 4/2007 | Okamoto ...................... 358/1.14 |
| 2007/0094499 | A1* | 4/2007 | Dokuni ......................... 713/168 |
| 2007/0106668 | A1 | 5/2007 | Maegawa et al. |
| 2007/0136293 | A1* | 6/2007 | Mizumukai ....................... 707/9 |
| 2009/0024531 | A1* | 1/2009 | Yamahata et al. .............. 705/55 |

FOREIGN PATENT DOCUMENTS

| JP | 2006-035631 | 2/2006 |
| JP | 2006-167928 | 6/2006 |
| JP | 2007-090802 | 4/2007 |
| JP | 2008-243180 | 10/2008 |

* cited by examiner

*Primary Examiner* — Chad Dickerson
(74) *Attorney, Agent, or Firm* — McDonnell Boehnen Hulbert & Berghoff LLP

(57) ABSTRACT

An image forming apparatus includes an application management unit that detects a restricted function of which use by a given user is inhibited from among functions within an application. The image forming apparatus further includes a function monitoring unit that registers the restricted function detected by the application management unit, and inhibits the user from executing the restricted function.

12 Claims, 6 Drawing Sheets

IMAGE FORMING APPARATUS AND IMAGE FORMING SYSTEM

INCORPORATION BY REFERENCE

This application is based upon and claims the benefit of priority from corresponding Japanese Patent Application No. 2009-133522, filed Jun. 2, 2009, the entire contents of which is incorporated herein by reference.

BACKGROUND

1. Field

The present invention relates to an image forming apparatus and an image forming system.

2. Description of the Related Art

Some image forming apparatus such as a printer, a copier, and a multifunction peripheral are provided with an application that becomes available after acquisition of a license. Further, in some image forming apparatus, a restricted function of which use is inhibited can be set for each user.

In addition, there are image forming apparatus having an application in which, as a license is acquired for each function within the application, the function for which the license is acquired becomes available within the application.

However, in a case where license control and function restriction are both implemented in the application, for example, upon execution of an application of which use is permitted according to the license, there is a fear in that a restricted function of which use is inhibited may be executed from the application.

Further, in a case of acquiring a license for each function within the application, it is necessary to previously specify the restricted function(s) for each user before acquiring the license, which complicates license management.

SUMMARY

An object of the present invention is to provide an image forming apparatus and an image forming system, which are capable of positively executing function restriction while performing license management for each application.

An image forming apparatus according to the present invention includes at least one application, an application management unit that detects a restricted function of which use by a given user is inhibited from among functions within the at least one application, and a function monitoring unit that registers the restricted function detected by the application management unit and inhibits the user from executing the restricted function.

An image forming system according to the present invention includes a server device and an image forming apparatus. The server device includes a storage unit that stores account data for each user, where the account data includes a restricted function of which use by the user is inhibited from among functions within an application. In addition, a communication unit performs communications with the image forming apparatus in order to access the account data. The image forming apparatus includes a communication unit that performs communications with the server device in order to access the account data, an application management unit that reads the account data from the storage unit of the server device by using the communication unit and detects the restricted function regarding a given user, and a function monitoring unit that registers the restricted function detected by the application management unit and inhibits the user from executing the restricted function.

Additional features and advantages are described herein, and will be apparent from the following Detailed Description and the figures.

DETAILED DESCRIPTION OF THE PREFERRED EMBODIMENTS

Figure 1:
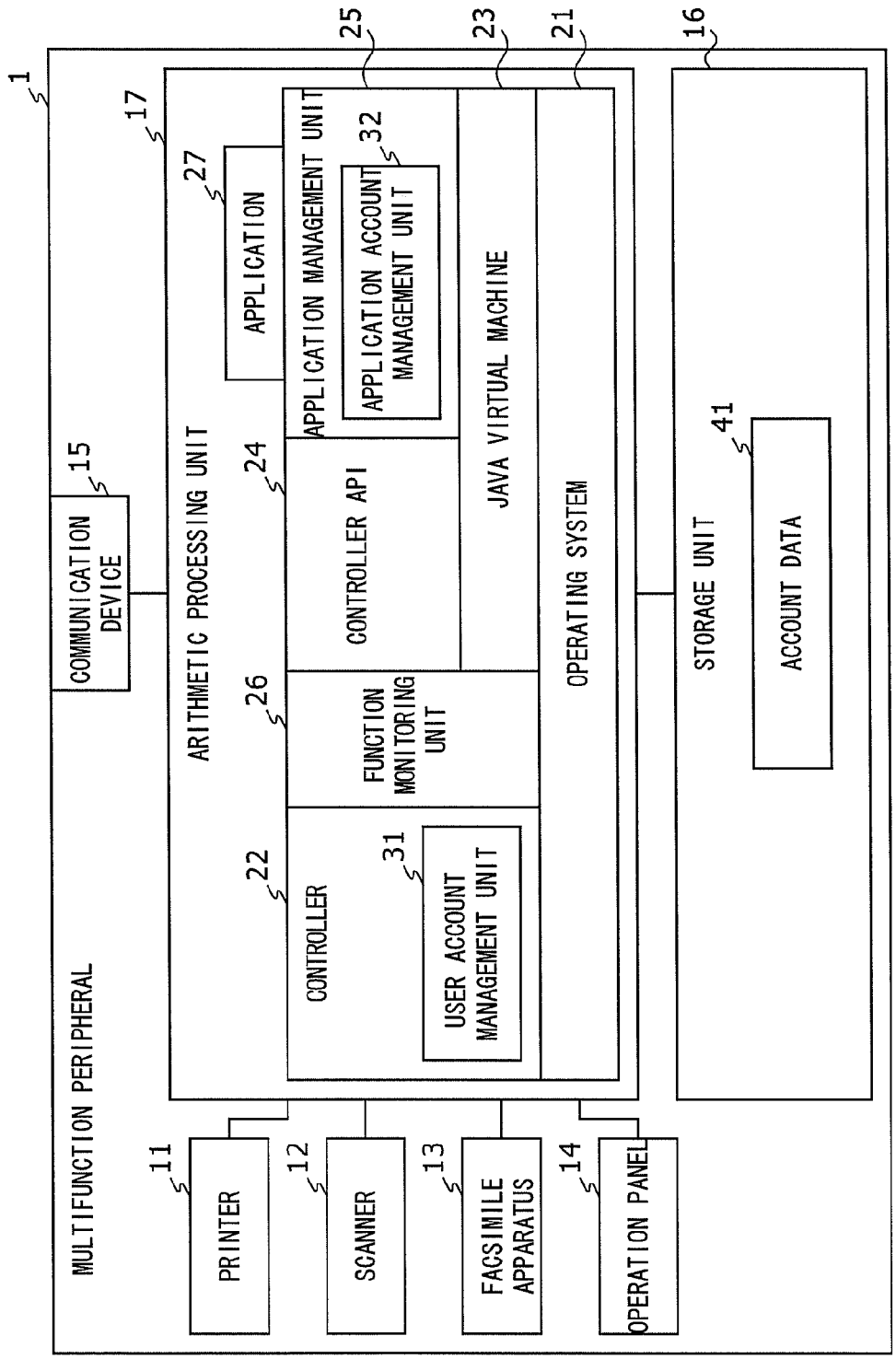
FIG. 1 is a block diagram illustrating a configuration of a multifunction peripheral according to an embodiment of the present invention.

FIG. 1 is a block diagram illustrating a configuration of a multifunction peripheral according to an embodiment of the present invention.

A multifunction peripheral 1, which is an example of an image forming apparatus, includes a printer 11, a scanner 12, a facsimile apparatus 13, an operation panel 14 (an example of a display device), a communication device 15, a storage unit 16, and an arithmetic processing unit 17.

The printer 11 is an apparatus that prints a document image based on print data. The scanner 12 is an apparatus that optically reads a document image from a document and generates image data on the document image. The facsimile apparatus 13 is an apparatus that generates a facsimile signal from document data to be transmitted and transmits the facsimile signal, and that receives a facsimile signal and converts the facsimile signal into document data.

The operation panel 14 is disposed at a surface of a casing of the multifunction peripheral 1, and includes (i) a display device that displays thereon various kinds of information with respect to the user and (ii) an input device that detects a user operation. An example of the display device includes a liquid crystal display. Examples of the input device include a key switch and a touch panel.

The communication device 15 is a device connected to a communication channel, which allows data communications with a developer terminal device (not shown). In a case where the multifunction peripheral 1 and the developer terminal device are connected to the same computer network, a network interface is used as the communication device 15. In a case where the multifunction peripheral 1 and the developer terminal device are connected to the same telephone network, a modem is used as the communication device 15.

The storage unit 16 is a device capable of storing various programs and various kinds of data. Used as the storage unit 16 may be a hard disk drive, a nonvolatile memory, or the like.

The arithmetic processing unit 17, which may be a computer including a central processing unit (CPU), a read only memory (ROM), and a random access memory (RAM), loads a program from the storage unit 16 or the like into the RAM and causes the CPU to execute the program.

Pre-stored on the storage unit 16 are at least account data 41 and a program required for operation of the multifunction peripheral 1. Then, the program is appropriately executed by the arithmetic processing unit 17 after the start of the multifunction peripheral 1. Realized by the program are an operating system (OS) 21, a controller 22, a JAVA virtual machine 23, a controller application program interface (API) 24, an application management unit 25, a function monitoring unit 26, and an application 27.

The account data 41 includes a user ID of an authorized user and a restricted function ID of a restricted function of which use is inhibited on a user basis.

The controller 22 controls the printer 11, the scanner 12, the facsimile apparatus 13, and the operation panel 14 and performs input/output of data thereto/therefrom.

In addition, the controller 22 includes a user account management unit 31. The user account management unit 31 references the account data 41 to perform a login process for the user (user authentication and registration of a logged-in user) and perform a logout process (deregistration of the logged-in user).

The controller API 24 causes the controller 22 to operate according to an instruction from the application running on the JAVA virtual machine 23 in a case of causing the functions of the printer 11, the scanner 12, the facsimile apparatus 13, and the operation panel 14 to be executed or the input/output of data to be performed thereto/therefrom. Note that in this embodiment, the function monitoring unit 26 is provided between the controller API 24 and the controller 22, and the controller API 24 uses the controller 22 through the intermediation of the function monitoring unit 26.

The application management unit 25 manages a life cycle (installation, start, stop, and uninstallation) of the application 27. For example, when license information for an application 27 is input by the user, the application management unit 25 may install the application 27.

In addition, the application management unit 25 includes an application account management unit 32 that detects a restricted function of which use by a given user is inhibited from among a plurality of functions within the application 27.

The function monitoring unit 26 registers the restricted function detected by the application management unit 25. If a function execution request for the application is made by the user, the function monitoring unit 26 determines whether or not the function specified by the function execution request is registered as the restricted function. If the function specified by the function execution request is not registered as the restricted function, the function monitoring unit 26 permits the execution of the function specified by the function execution request. If the function specified by the function execution request is registered as the restricted function, the function monitoring unit 26 inhibits the execution of the function specified by the function execution request. Note that the function monitoring unit 26 registers the restricted function by writing the restricted function ID (such as a code number, a class name, or a function name) of the restricted function to be registered into a table stored in the RAM or on the storage unit 16.

The application 27 is caused to start and/or stop by the application management unit 25 based on an operation performed by the user through the operation panel 14. Further, responsive to detection of the function execution request made by the user, the application 27 causes the controller 22 to execute the function (for example, color printing) specified by the function execution request through the intermediate controller API 24 and function monitoring unit 26. The management of the function restriction is performed by the function monitoring unit 26, and hence the function restriction is not performed within the application 27. That is, without consideration given to the function restriction, the application 27 issues the function execution request to the controller API 24.

Described next is an operation of the above-mentioned apparatus.

Hereafter described is (1) a processing at the start of the application, (2) a processing responsive to reception of the function execution request for the application made by the user, and (3) a processing at the end of the application.

Note that it is assumed here that the user has already logged in. If the user performs a login operation through the operation panel 14, the user account management unit 31 performs the user authentication. If the user is an authorized user, the user account management unit 31 permits the user to use the apparatus and registers the user ID of the user as the logged-in user.

(1) Processing at a Start of the Application

Figure 2:
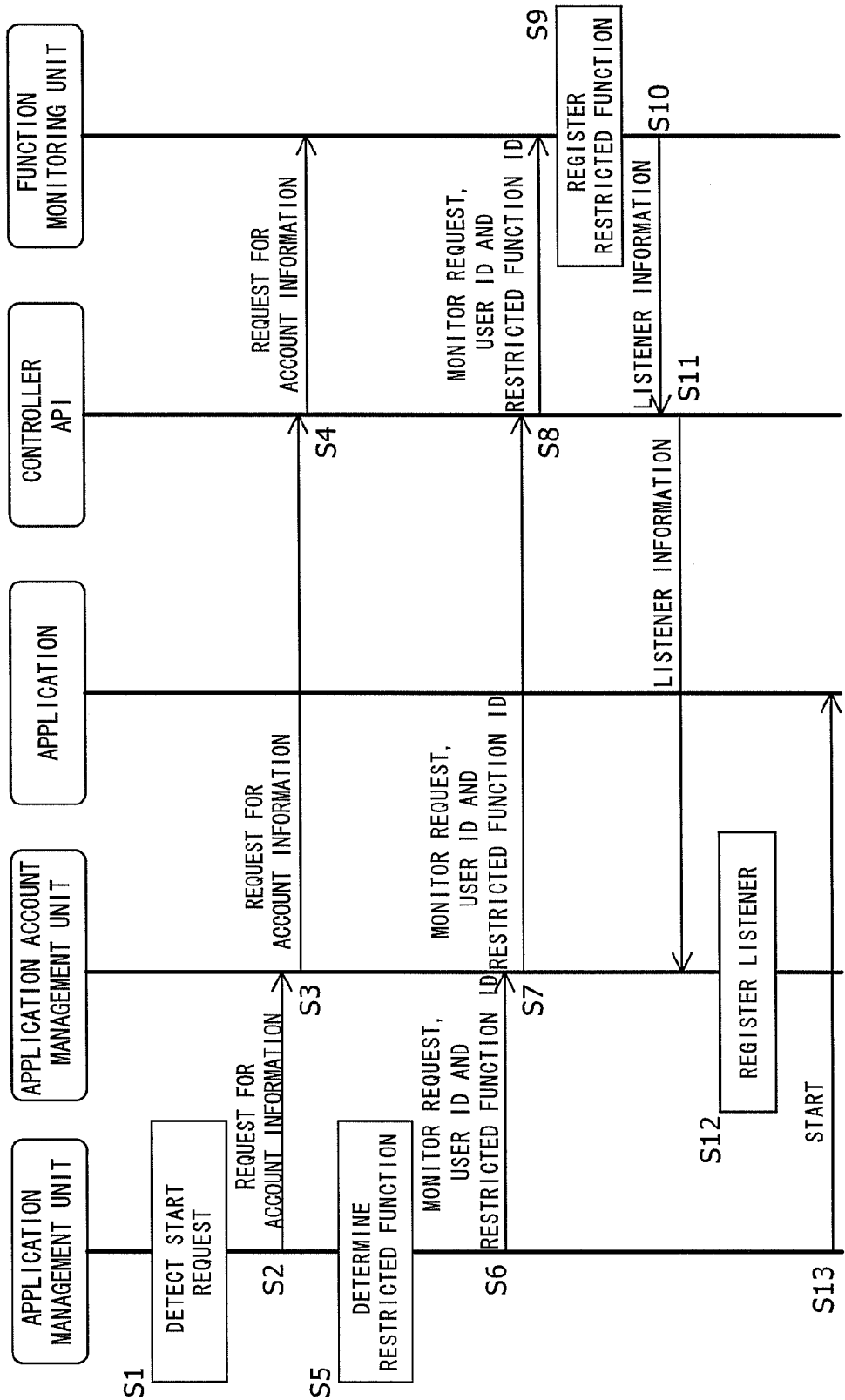
FIG. 2 is a sequence diagram that describes an operation of the multifunction peripheral of FIG. 1 at a start of the application.

FIG. 2 is a sequence diagram that describes an operation of the multifunction peripheral of FIG. 1 at the start of the application.

For example, responsive to detecting a user operation making a start request for the application 27 through the operation panel 14, information on the user operation (hereinafter, referred to as "user operation information") is supplied to the application management unit 25 of the arithmetic processing unit 17. Then, based on the user operation information, the application management unit 25 detects the start request for the application 27 (Step S1).

Responsive to detecting the start request for the application 27, the application management unit 25 supplies the application account management unit 32 with a request for account information (hereinafter, referred to as "account information request") along with the user ID of the logged-in user and the application ID of the application 27 (Step S2). Then, the application account management unit 32 supplies the controller API 24 with the account information request along with the user ID and the application ID (Step S3). At this time, the application account management unit 32 determines whether or not the license for the application exists (that is, whether or not the license information has already been input). Only in a case where the license exists, the processing of Step S3 and the subsequent steps is executed.

The controller API 24 transfers the account information request to the function monitoring unit 26 along with the user ID and the application ID (Step S4). Responsive to reception of the account information request along with the user ID and the application ID, the function monitoring unit 26 references the account data 41 to read one or a plurality of restricted function IDs associated with the user ID and the application ID, and supplies the controller API 24 therewith as a response. The response (that is, the restricted function ID(s)) is supplied to the application management unit 25 via the application account management unit 32.

Then, based on the response to the account information request, the application management unit 25 identifies presence/absence of the restricted function considered when the logged-in user uses the application for which the logged-in user has made the start request (Step S5). If a restricted function is present in the response, the one or a plurality of restricted function IDs are identified from the response.

In a case where there is at least one restricted function to be considered when the logged-in user uses the application for which the logged-in user has made the start request, the application management unit 25 supplies the application account management unit 32 with a monitor request along with the user ID of the logged-in user and the restricted function ID (Step S6). The application account management unit 32 supplies the controller API 24 with the monitor request along with the user ID and the restricted function ID (Step S7). The controller API 24 transfers the monitor request to the function monitoring unit 26 along with the user ID and the restricted function ID (Step S8). Responsive to receiving the monitor request, the user ID, and the restricted function ID, the function monitoring unit 26 registers the user ID and the restricted function ID in a monitor object table (not shown) in association with each other (Step S9). In addition, identification information on a listener called when the execution of the function of the restricted function ID is supplied by the user of the user ID is registered in the monitor object table in association with the user ID and the restricted function ID. The monitor object table may be stored in the RAM within the arithmetic processing unit 17 or on the storage unit 16.

Then, responsive to completing registration, the function monitoring unit 26 supplies the controller API 24 with the registered identification information on the listener as the response (Step S10). The response (that is, identification information on the listener) is transferred to the application account management unit 32 (Step S11). Then, the application account management unit 32 retains the user ID, the restricted function ID, and the identification information on the listener in association with one another, for example, in the RAM (Step S12).

Meanwhile, responsive to completing the registration of the restricted function by the function monitoring unit 26, the application management unit 25 starts the application 27 specified by the user (Step S13).

As described above, if there exists a restricted function within the specified application 27, the restricted function is registered at the start of the application 27. Note that if there exists no restricted function within the specified application 27 (Step S5), the processing of Steps S6 to S12 is not performed, and the application 27 is started (Step S13).

Figure 3:
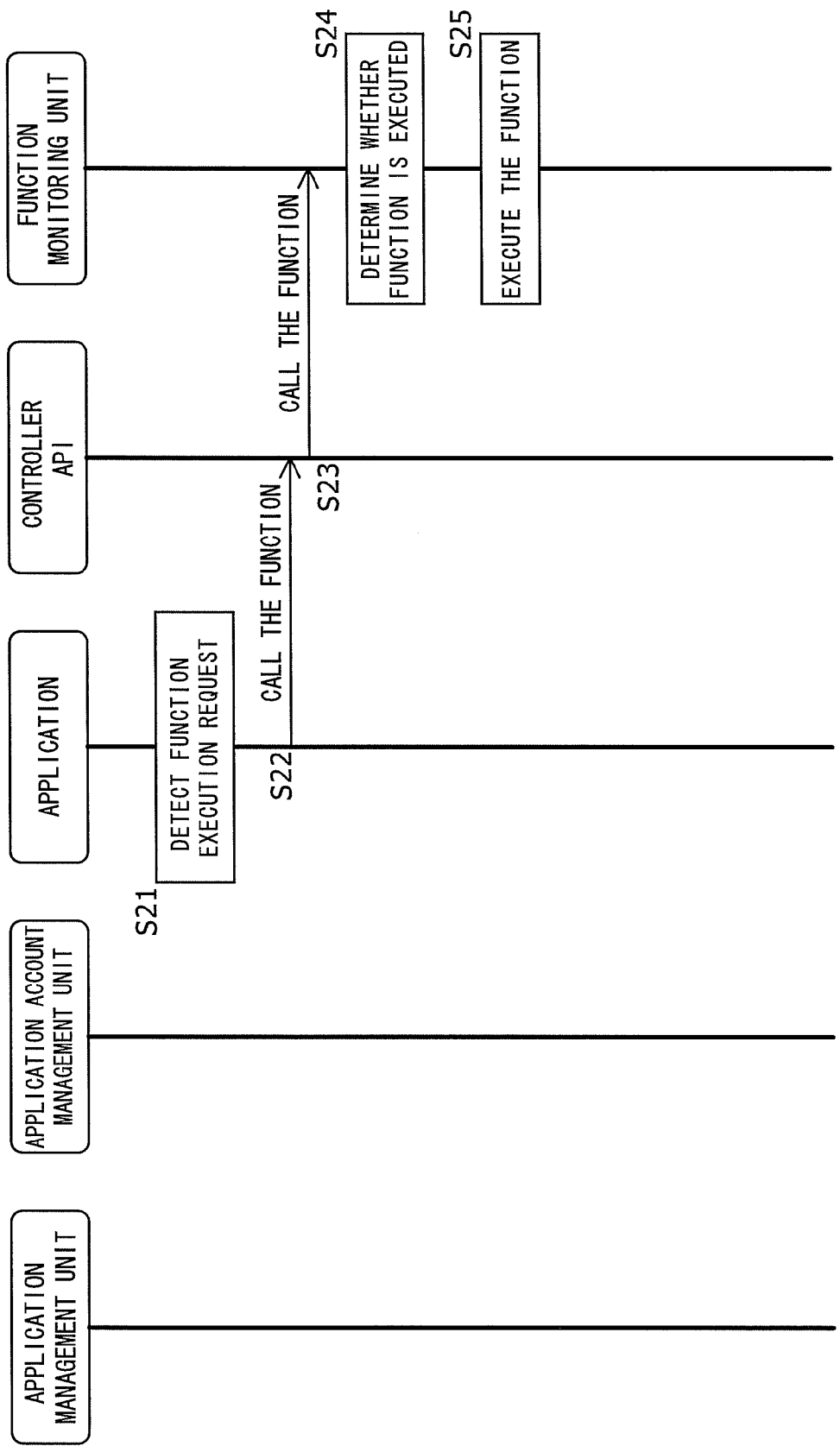
FIG. 3 is a sequence diagram that describes the operation of the multifunction peripheral of FIG. 1 in a case where a function execution request regarding the application is approved.
Figure 4:
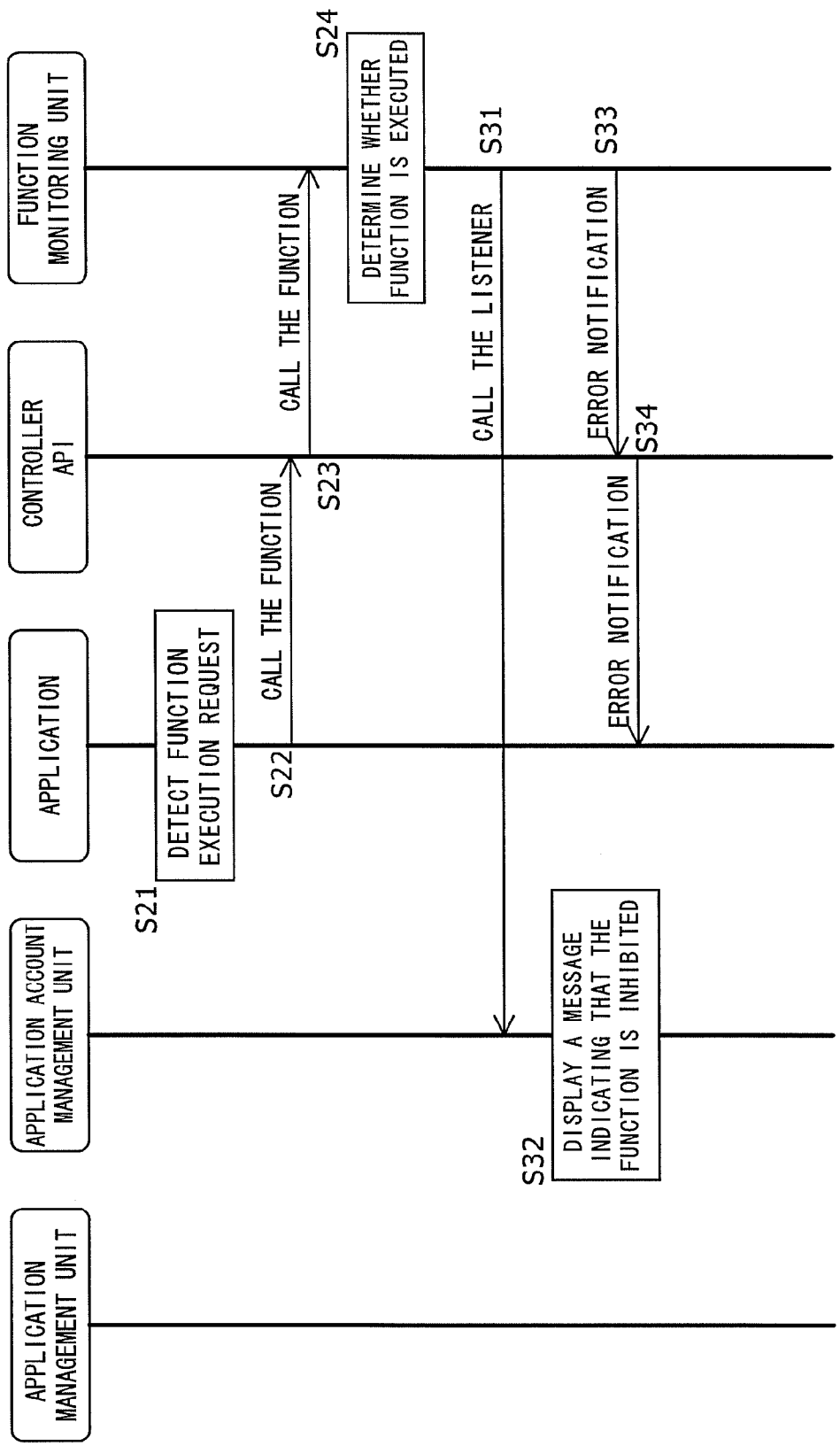
FIG. 4 is a sequence diagram that describes the operation of the multifunction peripheral of FIG. 1 in a case where the function execution request regarding the application is rejected.

(2) Processing Responsive to Receiving Function Execution Request for Application by User FIG. 3 is a sequence diagram that describes the operation of the multifunction peripheral of FIG. 1 in a case where the function execution request regarding the application is approved. FIG. 4 is a sequence diagram that describes the operation of the multifunction peripheral of FIG. 1 in a case where the function execution request regarding the application is rejected.

After the start of the application 27, if the user operation for executing a given function is input to the operation panel 14 by the user, the user operation information is supplied to the application 27. Then, based on the user operation information, the application 27 detects the function execution request by the user (Step S21). For example, when the application 27 is started, a menu screen for selecting a function is displayed. If one function (for example, color printing or scanning) is selected from the menu screen by the user, the selected function is identified based on the user operation information obtained in the selecting, and the function execution request by the user is detected.

Responsive to detecting the function execution request, the application 27 identifies the function ID (such as a code number, a class name, or a function name) of the requested function, and issues a call of the function accompanied by the function ID and the user ID of the logged-in user with respect to the controller API 24 (Step S22).

When the call is issued, the controller API 24 transfers the call to the function monitoring unit 26 (Step S23). Responsive to receiving the call from the controller API 24, the function monitoring unit 26 references the monitor object table to read the restricted function ID registered in association with the user ID accompanying the call. Then, the function monitoring unit 26 determines whether or not the function ID accompanying the call of the function matches any one of the restricted function IDs (Step S24).

If the function ID accompanying the call of the function matches none of the restricted function IDs, the function monitoring unit 26 transfers the call to the controller 22, and causes the controller 22 to execute the requested function (Step S25).

Alternatively, if the function ID accompanying the call of the function matches any one of the restricted function IDs, the function monitoring unit 26 does not transfer the call to the controller 22, but rather calls the listener associated with the restricted function ID (Step S31). Accordingly, the application account management unit 32 detects an execution request for the restricted function. Then, the application account management unit 32 causes the operation panel 14 to display thereon a message indicating that the logged-in user is inhibited from executing the function requested by the logged-in user (Step S32).

If the function ID accompanying the call of the function matches any one of the restricted function IDs, the function monitoring unit 26 discards the call and supplies the controller API 24 with an error notification as the response (Step S33). The response is then transferred to the application 27 (Step S34).

As described above, the function execution request by the user after the start of the application 27 is constantly monitored by the function monitoring unit 26 provided between the controller API 24 and the controller 22. The execution request for the registered restricted function is rejected, while the execution requests for the other functions are approved.

(3) Processing at an End of the Application

Figure 5:
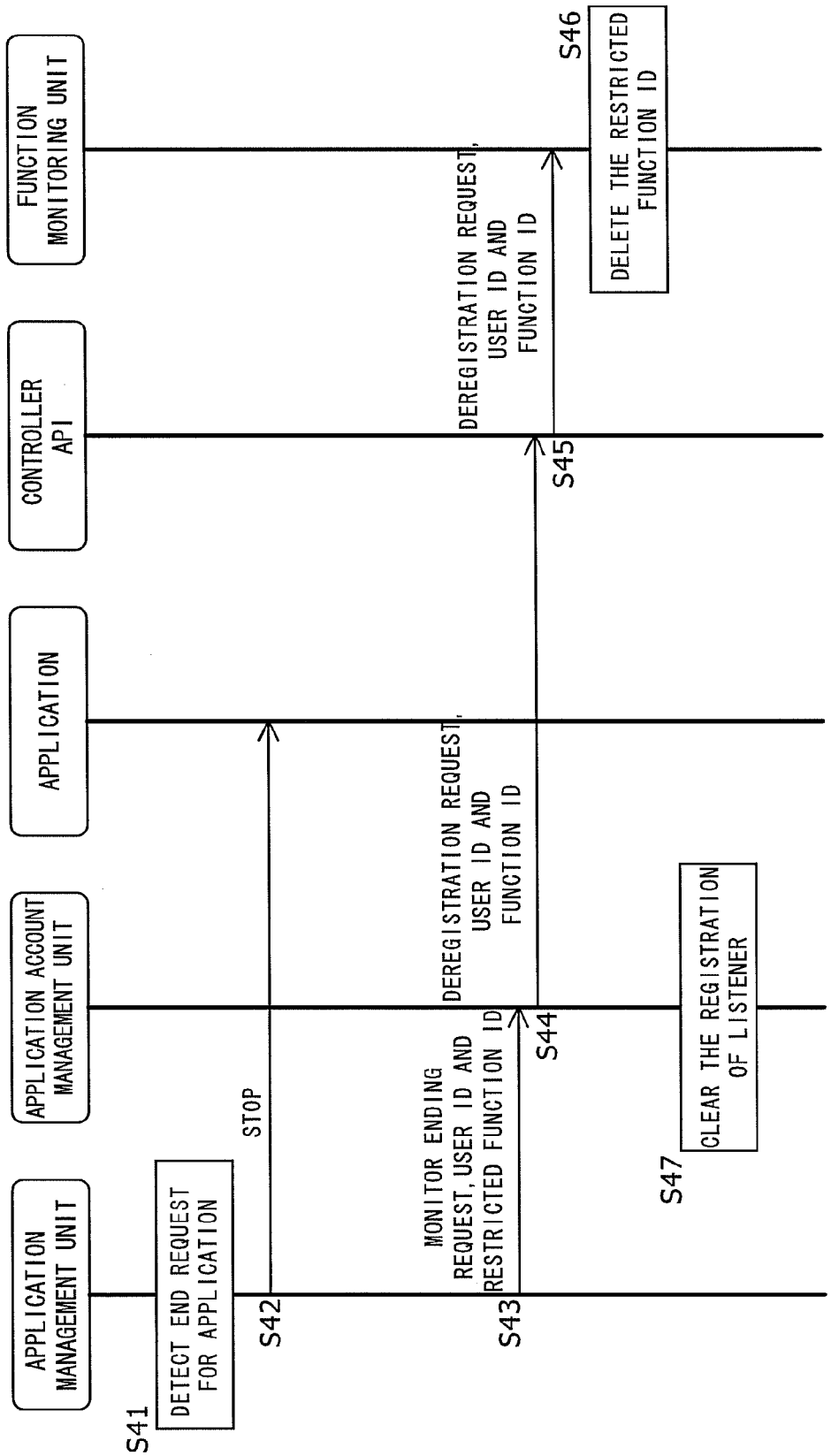
FIG. 5 is a sequence diagram that describes the operation of the multifunction peripheral of FIG. 1 at an end of the application.
Figure 6:
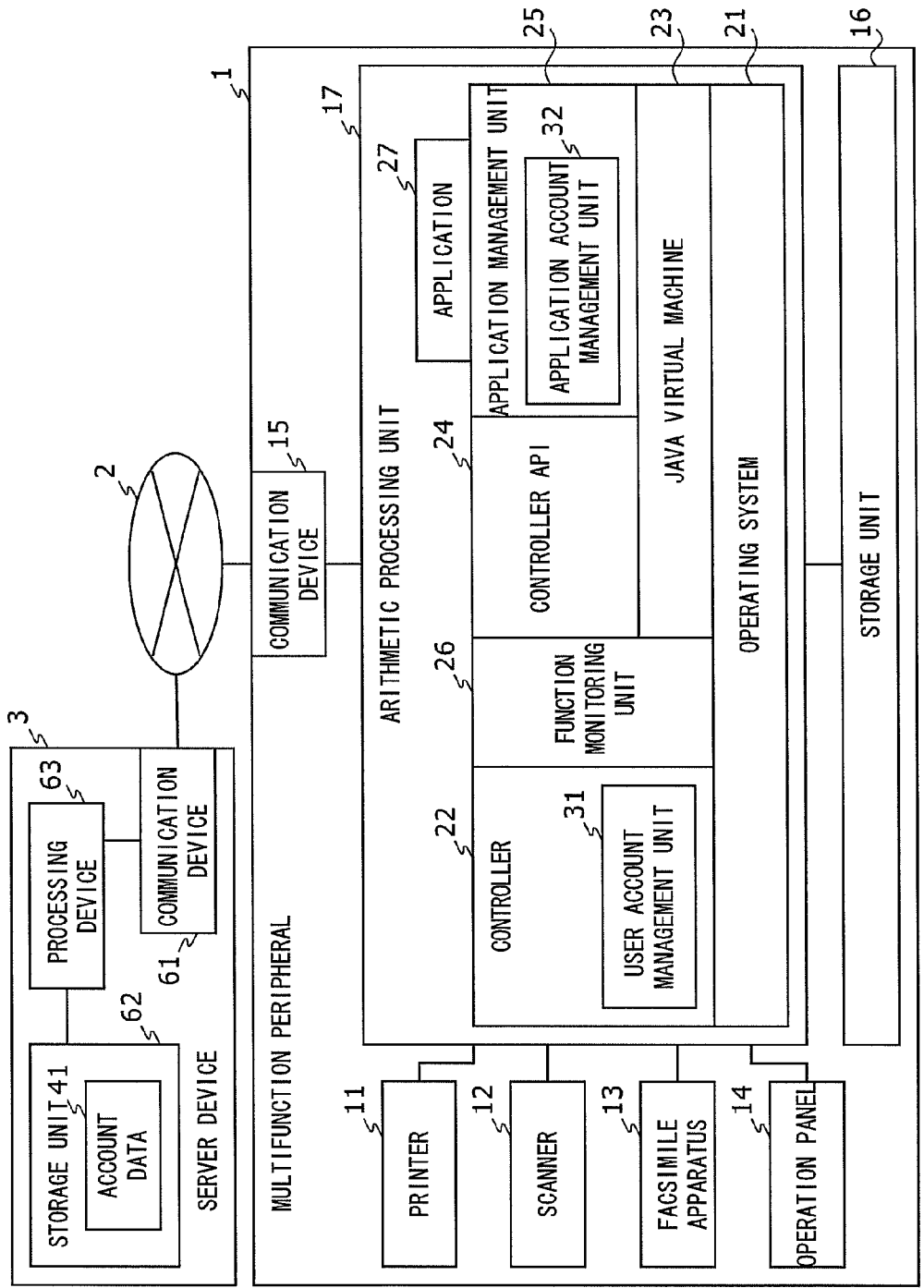
FIG. 6 is a block diagram illustrating a configuration of an image forming system according to another embodiment of the present invention.

FIG. 5 is a sequence diagram that describes an operation of the multifunction peripheral of FIG. 1 at the end of the application.

For example, responsive to detecting a user operation for making an end request for the application 27 through the operation panel 14, information on the user operation (hereinafter, referred to as "user operation information") is supplied to the application management unit 25 of the arithmetic processing unit 17. Then, based on the user operation information, the application management unit 25 detects the end request for the application 27 (Step S41).

Responsive to detecting the end request for the application 27, the application management unit 25 first causes the application 27 to stop (Step S42).

Then, the application management unit 25 supplies the application account management unit 32 with a monitor ending request along with the user ID of the logged-in user and the registered restricted function ID (Step S43). When the application account management unit 32 receives the monitor ending request, it supplies the controller API 24 with a deregistration request along with the user ID and the restricted function ID (Step S44). The controller API 24 then transfers the deregistration request to the function monitoring unit 26 along with the user ID and the restricted function ID (Step S45).

Responsive to receiving the deregistration request along with the user ID and the restricted function ID, the function monitoring unit 26 deletes the restricted function ID registered in association with the user ID from the monitor object table (Step S46).

Meanwhile, after supplying the deregistration request to the controller API 24, the application account management unit 32 clears the registration of the listener associated with the restricted function ID (Step S47).

As described above, if there is a restricted function within the specified application 27, the registration of the restricted function is cleared at the end of the application 27. If there is no restricted function within the specified application 27, the application 27 is ended, and the process of Steps S43 to S47 is not performed.

After that, if the user performs a logout operation through the operation panel 14, the user account management unit 31 performs the logout process. At a time of logout, all the restricted function IDs registered in association with the logged-in user are cleared.

As described above, according to the above-mentioned embodiment, the application management unit 25 detects the restricted function of which the use by a given user is inhibited from among the functions within an application 27. Then, the function monitoring unit 26 registers the restricted function detected by the application management unit 25. If the function execution request for the application 27 is made by the user, the function monitoring unit 26 determines whether or not the function specified by the function execution request is registered as the restricted function. If the function specified by the function execution request is not registered as the restricted function, the function monitoring unit 26 permits the execution of the function specified by the function execution request. If the function specified by the function execution request is registered as the restricted function, the function monitoring unit 26 inhibits the function specified by the function execution request.

Accordingly, the monitoring is constantly performed during the execution of the application so as to prevent the restricted function from being executed, which allows the function restriction regardless of the license for the application. Further, because the function monitoring unit 26 exists between the controller API 24 and the controller 22, a developer of the application 27 can develop the application 27 without consideration given to the function restriction.

Described next is another embodiment of the present invention.

In an image forming system according to another embodiment of the present invention, the multifunction peripheral 1 is connected to a server device 3 via a network 2.

The multifunction peripheral 1 according to the another embodiment does not include the account data 41. The account data 41 is stored not on the multifunction peripheral 1 but on the server device 3. The multifunction peripheral 1 instead acquires the account data 41 by accessing the server device 3 via the network 2.

The network 2 is a computer network such as a local area network or the Internet.

The server device 3 includes a communication device 61, a storage unit 62, and a processing device 63. The communication device 61 is a device of the same kind as the communication device 15, and is a device capable of performing data communications via the network 2. The storage unit 62 is a device of the same kind as the storage unit 16, and stores the account data 41. The processing device 63 is a device that reads the account data 41 in response to a request from the multifunction peripheral 1 and transmits the account data 41 to the multifunction peripheral 1.

When the application management unit 25 attempts to acquire the account information, the application account management unit 32 controls the communication device 15 to transmit an account information request to the server device 3 along with the user ID of the logged-in user and the application ID. Then, on the server device 3, the processing device 63 reads the restricted function ID corresponding to the request and uses the communication device 61 to transmit the restricted function ID to the multifunction peripheral 1 as the response. Then, the application account management unit 32 receives the response (that is, restricted function ID) via the communication device 15.

Further, in the same manner, the user account management unit 31 controls the communication device 15 to acquire user registration information such as the user ID from the account data 41 stored on the server device 3 to thereby perform the login process and the like.

Note that each of the above-mentioned embodiments is a preferred example of the present invention, but the present invention is not limited thereto, and various modifications and changes can be made within the scope that does not depart from the gist of the present invention.

For example, in each of the above-mentioned embodiments, one application 27 is provided, but also in a case where a plurality of applications are executed, the same process as described above is appropriately executed on each of the applications. However, in that case, an application ID is registered together in the monitor object table, and the registration and the deregistration of the restricted function ID are performed for each individual application.

Further, if there is an application that has already started (for example, resident application) at a time of user login, the application management unit 25 detects the restricted function based on the account data 41 at the time of login. Then, the function monitoring unit 26 registers the restricted function for the application.

Further, in each of the above-mentioned embodiments, one multifunction peripheral 1 is provided, but a plurality of image forming apparatus (multifunction peripherals, printers, and the like) of the same kind as the multifunction peripheral 1 may be connected to the network 2, and the account data 41 may be managed on one server device 3 that is accessible to the plurality of image forming apparatus.

Further, in each of the above-mentioned embodiments, the restricted function may be set for each of one or more departments. In that case, in association with the user ID, a department ID of a department to which the user belongs is included in the account data. In addition, the restricted function ID of the restricted function regarding the department is included in association with the department ID. In the case where the restricted function ID is acquired, the restricted function ID associated with the department ID associated with the user ID may be acquired along with the restricted function ID associated with the user ID.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
a storage unit configured to store account data that includes one or more restricted function IDs associated with a user ID and an application ID of a restricted function in which execution is inhibited on a user basis;
a controller unit configured to control an operation of, and/or input or output of data with,
at least a printer unit and a scanner unit responsive to instructions from an application for which license information is input;
a controller application programming interface (API) configured to cause the controller unit to operate according to the instructions from the application for which the license information is input;
an application management unit configured to install the application for which the license information is input, start the application responsive to detecting a start request, and detect the restricted function ID of the restricted function from a plurality of functions within the application, of which use by a logged-in user having a logged-in user ID is inhibited based on the account data; and
a function monitoring unit configured to
register the restricted function ID of the restricted function in a monitor object table associated with the logged-in user ID and application ID based on the account data stored in the storage unit detected by the application management unit,
register in the monitor object table a listener ID which corresponds to a listener that is called when a restricted function ID associated with the logged-in user ID and application ID is detected in an instruction,
intercept the instructions sent from the application to the controller unit,
determine whether the intercepted instruction requests the restricted function,
responsive to determining that the intercepted instruction does request the restricted function having the restricted function ID and the application ID based on the monitor object table, inhibit the logged-in user from executing the restricted function having the restricted function ID and the application ID by calling the listener corresponding to the listener ID instead of the controller API, and
clear registration of the restricted function ID and the application ID from the monitor object table at the end of the application execution;
wherein the function monitoring unit is connected to the controller API and to the controller unit,
wherein the controller API causes the controller unit to operate by transmitting the instructions through the function monitoring unit, and
wherein the application is configured to issue the instructions to the controller API without consideration as to which of the functions may be restricted for the logged-in user.

2. The image forming apparatus according to claim 1, wherein the function monitoring unit is further configured to determine, responsive to a function execution request for the application being made by the user, whether or not a function specified by the function execution request is registered as the restricted function ID of the restricted function, and to inhibit the execution of the function specified by the function execution request if the function specified by the function execution request is registered as the restricted function ID of the restricted function.

3. The image forming apparatus according to claim 1, wherein:
the application management unit is further configured to detect the restricted function ID of the restricted function based on the account data responsive to a start request for the application being made after login of the logged-in user; and
the function monitoring unit is further configured to register the restricted function ID of the restricted function responsive to the start request for the application being made after login of the logged-in user.

4. The image forming apparatus according to claim 1, wherein:
the application management unit is further configured to detect the restricted function ID of the restricted function based on the account data responsive to the logged-in user logging in after a start of the application; and
the function monitoring unit is further configured to register the restricted function ID of the restricted function responsive to the logged-in user logging in after the start of the application.

5. The image forming apparatus according to claim 1, further comprising:
a display device; and
an application account management unit configured to cause the display device to display thereon a message responsive to execution of a function specified by a function execution request being rejected by the function monitoring unit.

6. The image forming apparatus according to claim 1, wherein the function monitoring unit is further configured to register at least one of a code number, a class name, and a function name identifying the restricted function ID of the restricted function.

7. The image forming apparatus according to claim 1, further comprising a communication unit configured to communicate with a remote server device to request account data for the logged-in user;
wherein the application management unit is further configured to detect the restricted function ID of the restricted function regarding the logged-in user from the retrieved account data.

8. An image forming system, comprising:
a server device; and
an image forming apparatus,
wherein the server device comprises:
a storage unit configured to store account data for each user, the account data including one or more restricted function IDs associated with a user ID and an application ID of a restricted function of which use is inhibited from among a plurality of functions within an application for which license information is input on a user basis; and
a first communication unit configured to communicate with the image forming apparatus in order to provide requested account data, and
wherein the image forming apparatus comprises:
a controller unit configured to control an operation of, and/or input or output of data with, at least a printer unit and a scanner unit responsive to instructions from the application;
a controller application programming interface (API) configured to cause the controller unit to operate according to the instructions from the application for which the license information is input;
a second communication unit configured to communicate with the server device to request account data;

an application management unit configured to install the application, start the application responsive to detecting a start request, retrieve the account data from the storage unit of the server device using the communication unit, and detect the restricted function having the restricted function ID regarding a given logged-in user having a logged-in user ID based on the account data; and a function monitoring unit configured to register the restricted function ID of the restricted function in a monitor object table in association with the logged-in user ID and the application ID based on the account data retrieved by the application management unit, register in the monitor object table a listener ID which corresponds to a listener that is called when a restricted function ID associated with the logged-in user ID and application ID is detected in an instruction, intercept the instructions sent from the application to the controller unit at a start of the application execution, determine whether the intercepted instruction requests the restricted function, responsive to determining that the intercepted instruction does request the restricted function having the restricted function ID and the application ID based on the monitor object table, inhibit the logged-in user from executing the restricted function having the restricted function ID and the application ID by calling the listener corresponding to the listener ID instead of the controller API, and clear registration of the restricted function ID from the monitor object table at an end of the application execution;

wherein the function monitoring unit is connected to the controller API and to the controller unit, wherein the controller API causes the controller unit to operate by transmitting the instructions through the function monitoring unit, and wherein the application is configured to issue the instructions to the controller API without consideration as to which of the functions may be restricted for the logged-in user.

9. The image forming system according to claim 8, wherein the function monitoring unit is further configured to determine, responsive to a function execution request for the application being made by the logged-in user, whether or not a function specified by the function execution request is registered as the restricted function ID of the restricted function, and to inhibit the execution of the function specified by the function execution request if the function specified by the function execution request is registered as the restricted function ID of the restricted function.

10. The image forming system according to claim 8, wherein:
the application management unit is further configured to detect the restricted function ID of the restricted function based on the account data responsive to a start request for the application being made after login of the logged-in user; and the function monitoring unit is further configured to register the restricted function ID of the restricted function responsive to the start request for the application being made after login of the logged-in user.

11. The image forming system according to claim 8, wherein:
the application management unit is further configured to detect the restricted function ID of the restricted function based on the account data responsive to the logged-in user logging in after a start of the application; and the function monitoring unit is further configured to register the restricted function ID of the restricted function responsive to the logged-in user logging in after the start of the application.

12. The image forming system according to claim 8, wherein the image forming device further comprises:
a display device; and an application account management unit configured to cause the display device to display thereon a message responsive to execution of a function specified by a function execution request being rejected by the function monitoring unit.

* * * * *